(12) United States Patent
Fujita et al.

(10) Patent No.: US 6,347,253 B1
(45) Date of Patent: Feb. 12, 2002

(54) CONTROL SYSTEM FOR EXECUTING A TASK INSTRUCTION BY PERFORMING DISTRIBUTED PROCESSING VIA A NUMBER OF MODULES

(75) Inventors: Nobuyuki Fujita; Yoshiaki Kohno, both of Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/264,002

(22) Filed: Mar. 8, 1999

(30) Foreign Application Priority Data

Apr. 30, 1998 (JP) .......................................... 10-120739

(51) Int. Cl.⁷ ............................................. G05B 13/02
(52) U.S. Cl. ............................... 700/28; 700/2; 700/20; 700/30; 700/31; 700/173; 700/250; 709/100; 709/105
(58) Field of Search .......................... 700/2–3, 28, 7, 700/9, 19, 20, 23, 27, 30–31, 86–89, 169, 249–250, 173, 174; 709/100, 105

(56) References Cited

U.S. PATENT DOCUMENTS 3,916,383 A  * 10/1975 Malcolm .................... 709/104
4,980,857 A  * 12/1990 Walter et al. ................. 714/45
5,499,320 A  *  3/1996 Backes et al. ............... 700/260
5,579,444 A  * 11/1996 Dalziel et al. ............... 700/259
6,058,334 A  *  5/2000 Shapiro ........................ 700/97

OTHER PUBLICATIONS

Research Furuits Report, "Holonic Manufacturing Systems: System Conponents of Autonomous Modules and Their Distributed Control" (Popular Version), Prime Contractor: Toshiba Corporation, Mar. 1997, pp. 147–155.

* cited by examiner

Primary Examiner—William Grant
Assistant Examiner—Ramesh Patel
(74) Attorney, Agent, or Firm—Oblon, Spivak, McClelland, Maier & Neustadt, P.C.

(57) ABSTRACT

A control system for executing task instructions, comprising a higher-order module for making an inquiry as to whether or not a task instruction can be executed, and a lower-order module for determining whether or not the task instruction can be executed, in response to the inquiry made by the higher-order module, the higher-order module including a task instruction decomposition section for decomposing the task instruction into a sequence of task instructions executable by the lower-order module, when the task instruction is inexecutable by the lower-order module, and further including a task instruction allocation section for allocating an executable task instruction to the lower-order module.

8 Claims, 7 Drawing Sheets

CONTROL SYSTEM FOR EXECUTING A TASK INSTRUCTION BY PERFORMING DISTRIBUTED PROCESSING VIA A NUMBER OF MODULES

BACKGROUND OF THE INVENTION

The present invention relates to a control system for controlling a production apparatus comprising a large number of devices, a production line comprising a number of such production apparatuses, and a production shop comprising a number of such production lines.

To be more specific, the present invention relates to a control system capable of executing a task instruction by performing distributed processing by means of a number of modules. The module which wants to have the task instruction done searches modules capable of executing it and allocates it to a selected module.

To control a cell (such as a production apparatus comprising a large number of structural elements) and a production shop (such as a production line having a group of production apparatuses), a control program is prepared and used. The control program is prepared on the basis of a configuration of the structural elements, the production apparatuses and the production line, and includes predetermined and fixed task allocations to the respective apparatuses.

If there is a change in the configuration, the entire control program has to be updated in accordance with such a change. For example, if one of the production apparatuses is changed to other one, the schedules have to be determined again with respect to all production apparatuses, including the existing ones.

BRIEF SUMMARY OF THE INVENTION

The conventional control system described above does not comprise a means for flexibly coping with a change in the configuration of the apparatuses. This being so, the conventional control system has a poor adaptability with a production system of the next generation.

The production system of the next generation is required to satisfy the demand for prompt start of production and the demand for prompt and flexible response to a change in the amount of production or a change in the kind of items to be produced. In addition to these, there is a strong demand for more efficient use of production equipment. If the entire control program has to be reconstructed each time a product apparatus or a system is changed to satisfy the demands, the rate of productivity is inevitably very low.

Accordingly, an object of the present invention is to provide a control system capable of flexibly coping with a change in the configuration of a production apparatuses or the like.

To attain the object, the present invention provides a control system which executes task instructions and which comprises a higher-order module for making an inquiry as to whether or not a task instruction can be executed, and a lower-order module for determining whether or not the task instruction can be executed, in response to the inquiry made by the higher-order module, the higher-order module including a task instruction decomposition section for decomposing the task instruction into a sequence of task instructions executable by the lower-order module when the task instruction is inexecutable by the lower-order module, and a task instruction allocation section for allocating an executable task instruction to the lower-order module.

In the present invention, the higher-order and lower-order modules constitute a hierarchical structure, but the number of layers provided is not limited to these two. For example, it is possible to provide a higher-order module that is being treated as being higher than the higher-order module described above. Alternatively, it is possible to provide a lower-order module that is being treated as being lower than the lower-order module described above.

According to the control system of the present invention, the higher-order and lower-order modules are provided as unit modules, which are substantially the same in constitution and can be easily added, deleted or replaced. In preferred embodiments described below, the unit modules will be described as distributed and mutually-cooperative holon modules.

When a task instruction is input to the higher-order module described above, an inquiry is made to the lower-order module, and when necessary the task instruction is decomposed into instructions that are executable by the lower-order module. The higher-order module and the lower-order module do not have fixed relationships. In other words, their relationships are determined, depending upon the circumstances. In this manner, the hierarchical-structure system of the present invention is based on inquiries and responses. Irrespective of the structure of the lower-order module, the structure which can execute a sequence of task instructions can be reorganized. Hence, even where there is a change in the structure of the apparatuses, such a change can be flexibly coped with.

The modules described above can be realized as either hardware or software. They be can easily installed in a single apparatus; alternatively, they can be distributedly provided for apparatuses that are connected as a network.

According to the second aspect of the present invention, there is provided a control apparatus for controlling a system made up of a plurality of structural elements. The structural elements include a first means and a second means. The first means makes an inquiry to another structural element to check whether or not a designated instruction can be executed, and receives a response from that second structural element. Where there is a structural element that responds to the inquiry that the instruction is executable, the second means allocates the instruction to that structural element. If the second structural element makes the response that the task instruction is inexecutable, then the second means decomposes the task instruction. Then, the second means makes an inquiry once again to check whether or not the decomposed instructions are executable. The decomposition of instructions and the allocation of them are continued until the decomposed instructions can be executed.

With this constitution, the task instructions can be decomposed in such a manner that the structure which can execute the sequence of task instructions can be reorganized, irrespective of the structure of each structural element. It is therefore possible to expect the same advantages as attained in the first aspect of the invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION (Fundamental Constitution of the System)

The control system of the present invention is used in a production shop made up of a robot, peripheral devices, and a number of apparatuses and automatically generates a control instruction or control program according to which the robot and the peripheral devices are controlled on the basis of a given task instruction.

Figure 1:
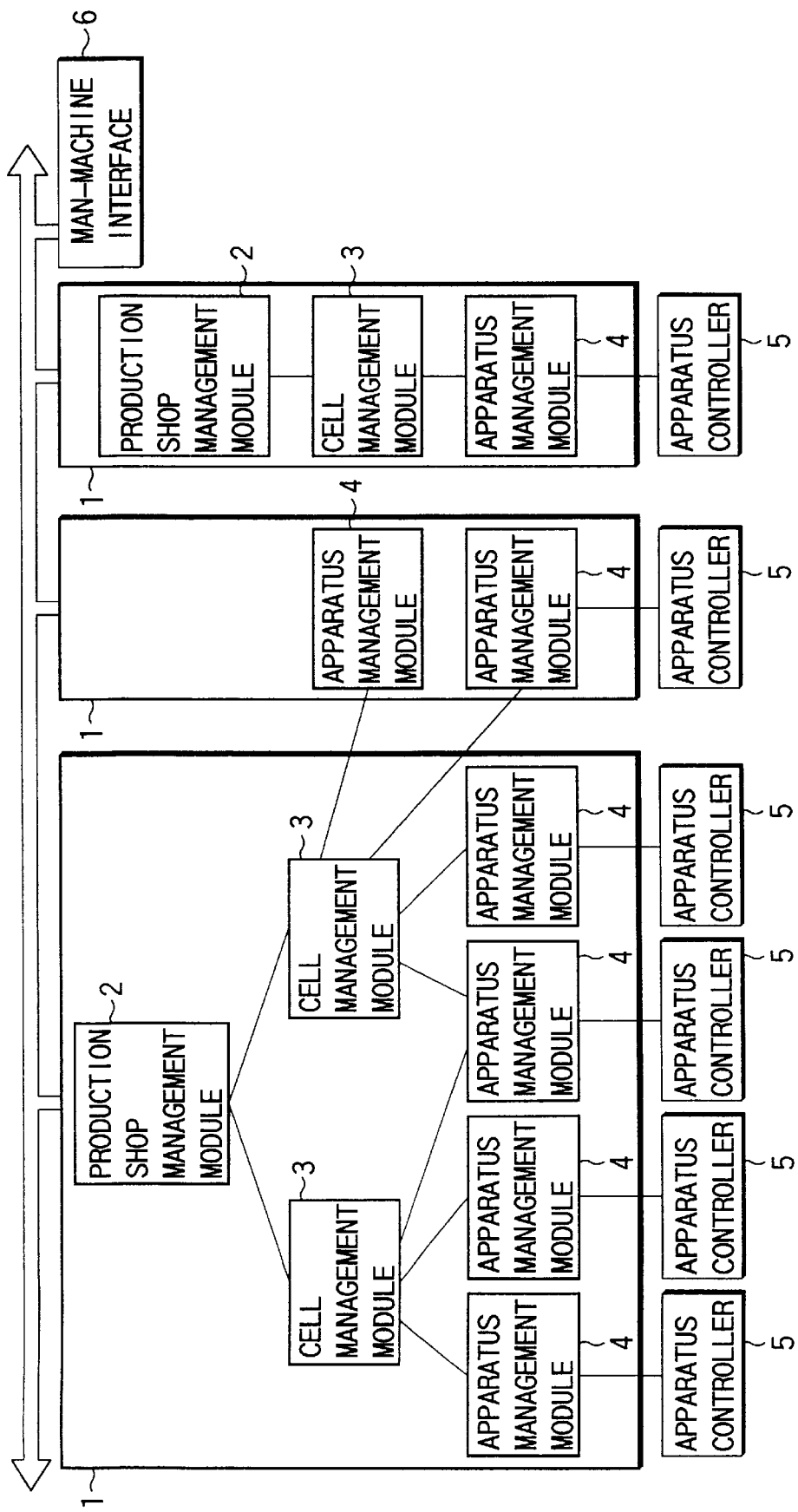
FIG. 1 is a schematic diagram showing a control system according to one embodiment of the present invention.

As shown in FIG. 1, a plurality of computers 1 are connected together to form a network. One or each of these computers 1 comprises: a production shop management module 2 for managing a production shop (such as a production line); a cell management module 3 for managing a cell (such as a part assembling device) provided for the production shop; and an apparatus management module 4 for managing a part supply apparatus, a driving table, etc. (apparatus controller 5) provided for the cell. These modules 2, 3 and 4 are provided to have a hierarchical structure. Each of these modules 2, 3 and 4 is a program module having a distributed and cooperative function and generally referred to as a holon.

When a task instruction is given from a man-machine interface 6, the holon modules 2, 3 and 4 communicate with each other, so as to generate a specific operation program used for controlling the cells and devices.

Figure 2:
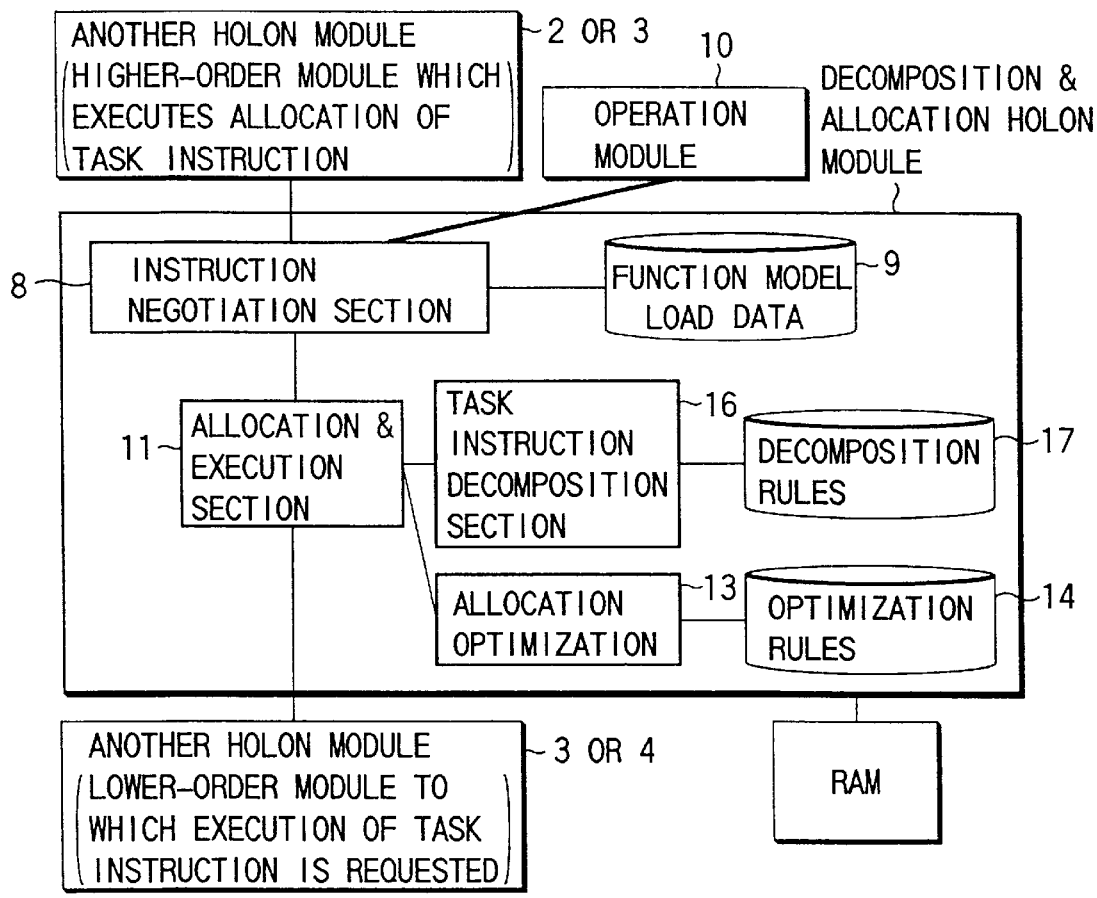
FIG. 2 is a schematic diagram showing a task decomposing/allocating holon module.
Figure 3:
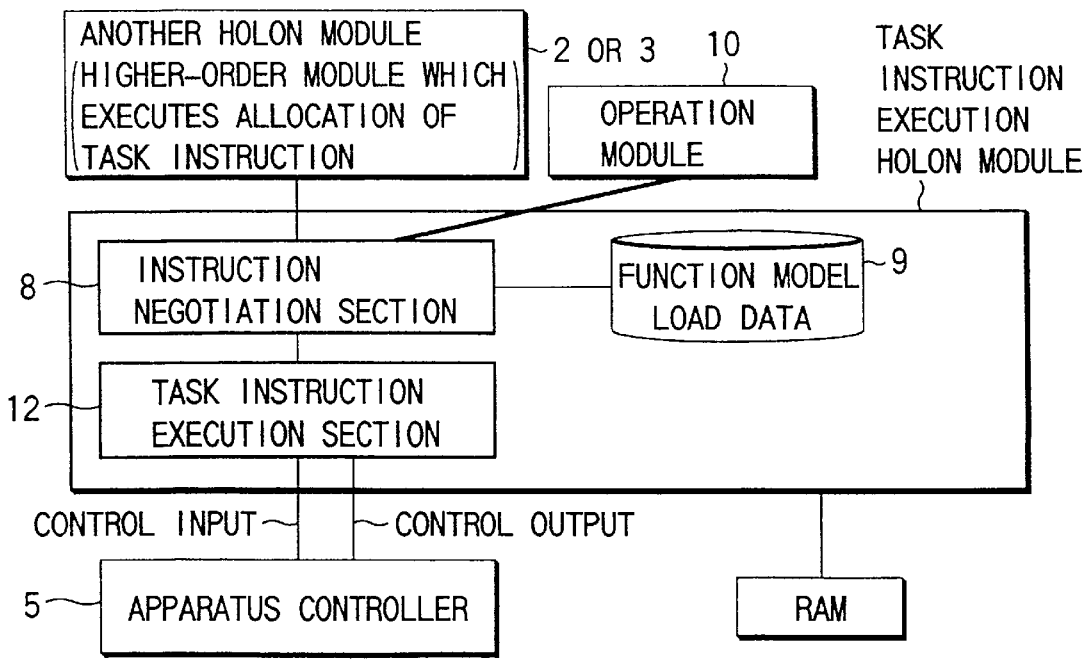
FIG. 3 is a schematic diagram showing a task executing holon module.

In principle, the holon modules 2, 3 and 4 are of the same constitution, an example of which is shown in FIGS. 2 and 3.

(Holon Module)

FIG. 2 shows a "task decomposing/allocating holon module" which is used exclusively for decomposing a task instruction and allocating it to another holon module. It should be noted that the "task decomposing/allocating holon module" does not execute a task instruction per se. The "task decomposing/allocating holon module" corresponds to the production shop management module 2 and the cell management module 3 described above.

FIG. 3 shows a "task executing holon module" which executes a task instruction. The "task executing holon module" corresponds to the apparatus management module 4. A holon module capable of performing a decomposing/allocating operation and executing a task instruction can be realized by combining the holon modules shown in FIGS. 2 and 3 together, but explanation of such a holon module will be omitted.

The functions of the holon modules will be described, referring to the block diagrams shown in FIGS. 2 and 3 and the operation flowchart (according to which the decomposing/allocating holon modules operate) shown in FIG. 4. Since the operation of the task executing holon modules can be explained based on the same flowchart, illustration of such an operation will be omitted.

(Instruction Negotiation Section)

Each of the task decomposing/allocating holon module and the task executing holon module comprises an instruction negotiation section 8. This instruction negotiation section 8 receives a task execution request (a task instruction) from a higher-order holon module, and determines whether or not the task instruction included in the request is executable, by using a function model & load data 9. Then, the instruction negotiation section 8 outputs a response to the request. The function model & load data 9 stores schedules of modules capable of executing task instructions, including lower-order holon modules.

Figure 4:
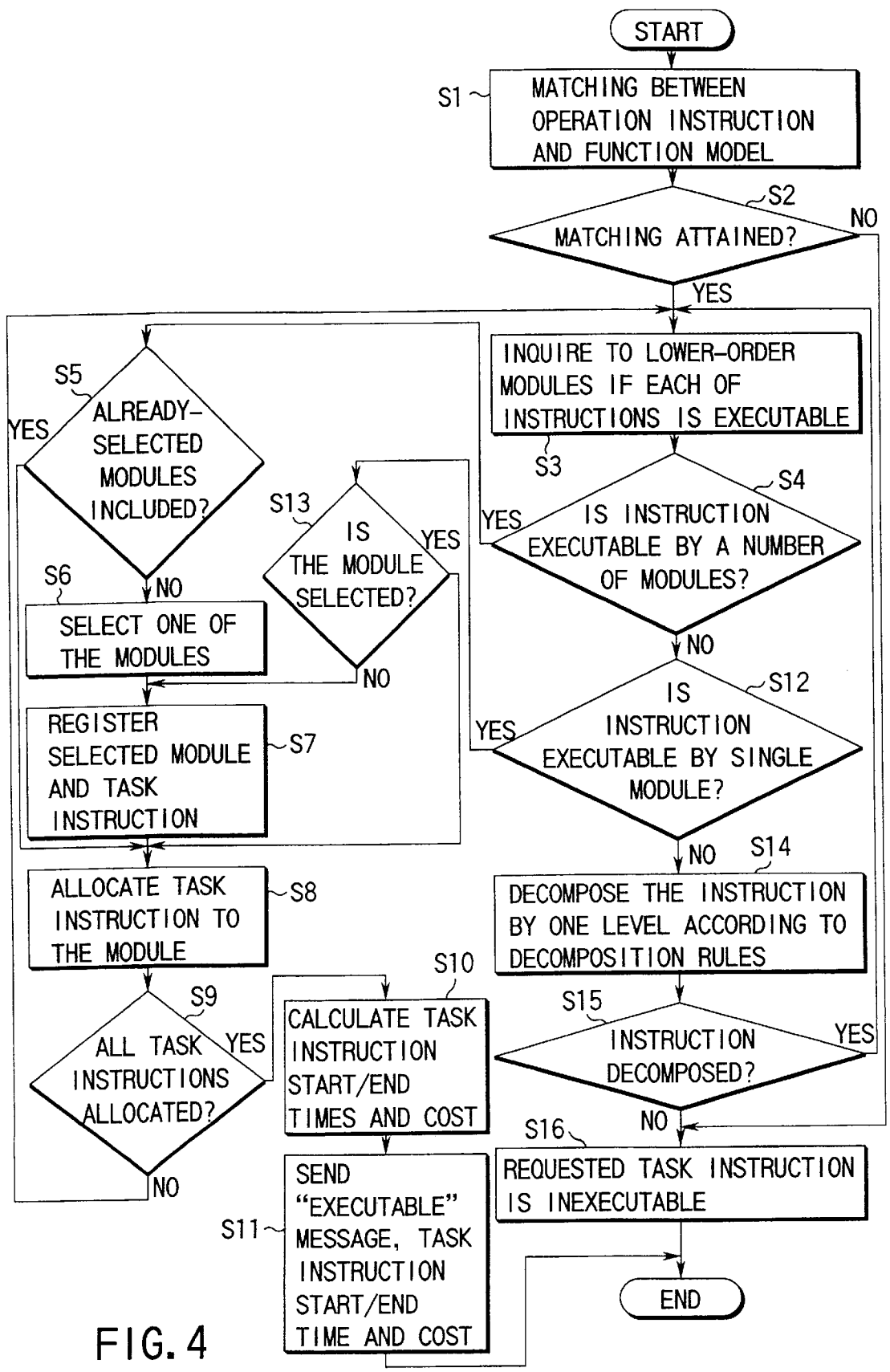
FIG. 4 is a flowchart according to which a higher-order module allocates a task instruction to a lower-order module.

Determination as to whether or not a task instruction is executable is made on the basis of the matching between the instruction word and the attribute of the task instruction and a group of executable instructions and the attributes stored in the function model 9 (Step S1 shown in FIG. 4).

Let us assume that the task instruction is "Assemble (Part A, Part B) [weight-20]" (this task instruction means that Part A which is 20 g in weight must be assembled with Part B). If the function model includes instruction "Assemble" and there is an attribute indicating that a part which is 10 g to 30 g in weight can be assembled, then it is determined that the task instruction is executable.

If the attribute matching requires execution of special operation processing, an operation module (element 10 shown in FIG. 2) is employed. This operation module 10 is a coordinate conversion program which performs orthogonal coordinate conversion or polar coordinate conversion.

The schedules stored in the function model 9 may be referred to, so as to determine whether the task instruction is executable.

If the task instruction is executable, it is supplied to an allocation & execution section 11 (Step S2 shown in FIG. 4) in the case of a decomposing/allocating holon module. In the case of a task executing holon module (FIG. 3), the task instruction is supplied to the apparatus controller 5 by way of an instruction execution section 12 at the time of actual execution of the task instruction.

If, on the other hand, the task instruction is not executable, no response is made to a higher-order holon module, and the processing is brought to an end ("END" in FIG. 4).

(Allocation & Executing Section)

In the case of a task decomposing/allocating holon module (FIG. 2), the allocation & execution section 11 that receives a task instruction first makes an inquiry to all lower-order holon modules to check whether they can execute the task instruction described above, i.e., "Assemble (Part A, Part B) [weight-20]", (Step S3 of FIG. 4). The "lower-order holon modules" are cell management modules 3 when the holon module in question is a shop management module 2, and are apparatus management modules 4 (i.e., task executing holon modules shown in FIG. 3) when it is a cell management module 3.

If the task instruction can be executed, each of the lower-order holon modules sends a message indicating "executable" to the holon module in question and informs it of the task start/end times and the cost. If the task instruction is decomposed by the lower-order holon modules, a group of decomposed task instructions are sent back. If the task instruction is determined as being inexecutable, no response is made to the inquiry.

If the allocation & execution section 11 receives "executable" messages from a number of lower-order holon modules (Step S4 in FIG. 4), step S5 is executed so as to check whether or not the lower-order holon modules include already selected or registered lower-order holon modules. If such modules are included, the task instruction is allocated to them (step S8).

In the case of this example, there must be no holon modules that are selected or registered. Accordingly, an optimal module is selected from among the holon modules described above (step S6). This selection is made by an allocation optimization section 13 shown in FIG. 2, on the basis of optimization rules 14. The optimization rules 14 include not only rules based on the order of priority but also rules related to scheduling, for example, and a holon module that can execute the task instruction according to an optimal schedule is selected. The order of priority need not be necessarily based on this. For example, a holon module capable of executing the task instruction by itself with no need to decompose the task instruction may be selected. If the task instruction has to be decomposed, this would lower the order of priority.

The schedules of the lower-order holon modules may be stored as part of the optimization rules 14 or as a load model of the function model 9, and an optimal holon module may be selected on the basis of such schedules.

In step S7 shown in FIG. 4, the data on the selected holon module is stored in the storage means, such as a RAM. Subsequently, the task instruction is allocated to the selected holon module (Step S9).

If it is determined in steps S4 and S12 that the task instruction can be executed by a single holon module, a check is made to see whether that single holon module is already selected or registered (Step S13). In the case of this example, there must be no holon modules that are selected or registered. Accordingly, the single holon module is registered in step S7. If a holon module is already registered, then the task instruction is allocated thereto in step S8.

Subsequently, in step S9, determination is made as to whether all task instructions have been allocated. In the case of this example, the task instruction "Assemble (Part A, Part B) [weight-20]" is all the task instruction that must be allocated. Accordingly, the flow advances to step S10, so as to calculate the task start/end times (schedules) and the cost. This calculation is executed by the instruction negotiation section 8, and the result of calculation is sent back to the higher-order holon module.

(Case Where Task Instruction Is Decomposed)

The example described above refers to the case where the task instruction provided by the higher-order holon module can be executed by a lower-order holon module, with no need to decompose the task instruction. However, there can be a case where the task instruction has to be decomposed so as to have it executed by the lower-order holon module or modules.

Let us assume that the task instruction is "Assemble (Part A, Part B) [weight-20]" (which means that Part A, which is 20 g in weight, must be assembled with Part B). If, in this case, the apparatus controlled by the lower-order holon module is a part-conveying apparatus or robot that conveys a single part and therefore cannot deal with the instruction "Assemble", then the task instruction has to be executed after it is decomposed, for example, as follows: (1) "Supply Part B" (2) "Supply Part B at working place", (3) "Supply Part A", (4) "Put Part A on Part C".

A task instruction decomposition section 16, shown in FIG. 2, decomposes the task instruction according to decomposition rules 17 such that the task instruction is divided into the four instructions (1)–(4) described above (step S14). When the task instruction has been decomposed (step S15), an inquiry is made to the lower-order holon modules with respect to each of the instructions (step S3). After the task instruction is allocated to the holon module that executes the instruction (1) (step S8), the flow returns from step S9 to step S3, and similar allocating processing is performed for each of the remaining task instructions (2)–(4).

After all task instructions obtained by the decomposition have been allocated to the lower-order holon modules in this fashion, the instruction negotiation section described above calculates the task start time, the task end time and the cost (step S10). Results of this calculation are sent to the higher-order holon module, along with a massage indicating "executable" (step S11).

If the holon modules to which the task instruction has been allocated are task executing holon modules (FIG. 3), such as apparatus management modules 4, instructions are sent to the apparatus controller 5 on the basis of the allocated task instruction. In response to the instructions, the apparatus controller 5 controls various apparatuses (not shown) and have the task instructions (1)–(4) executed at the predetermined timing.

(Advantages)

The control system comprising holon modules arranged to have a hierarchical structure is advantageous in that:

(1) Each time a task instruction is entered, a combination of apparatuses that are required for the execution of the task instruction can be selected, and the task instruction can be allocated to the selected apparatuses.

(2) Therefore, even where there is a change in the structure of the apparatuses, as in the case where a new apparatus is added or the apparatuses are partly out of order, a new holon module can be added or an existing holon module can be deleted in such a manner as to cope with the change in the structure of the apparatuses. By simply changing the number of holon modules employed, the entirety of the apparatus can be automatically restructured.

(3) The scheduling for each apparatus is executed in such a manner as to cope with the present situation. Accordingly, even if there is a change in the structure of the apparatuses, as in the case where a new apparatus is added or the apparatuses are partly out of order, the scheduling can be executed again in such a manner as to be optimal to the situation.

A more specific description will be given of the present invention, referring to a part assembling apparatus to which the control system is applied.

(First Embodiment)

Figure 5:
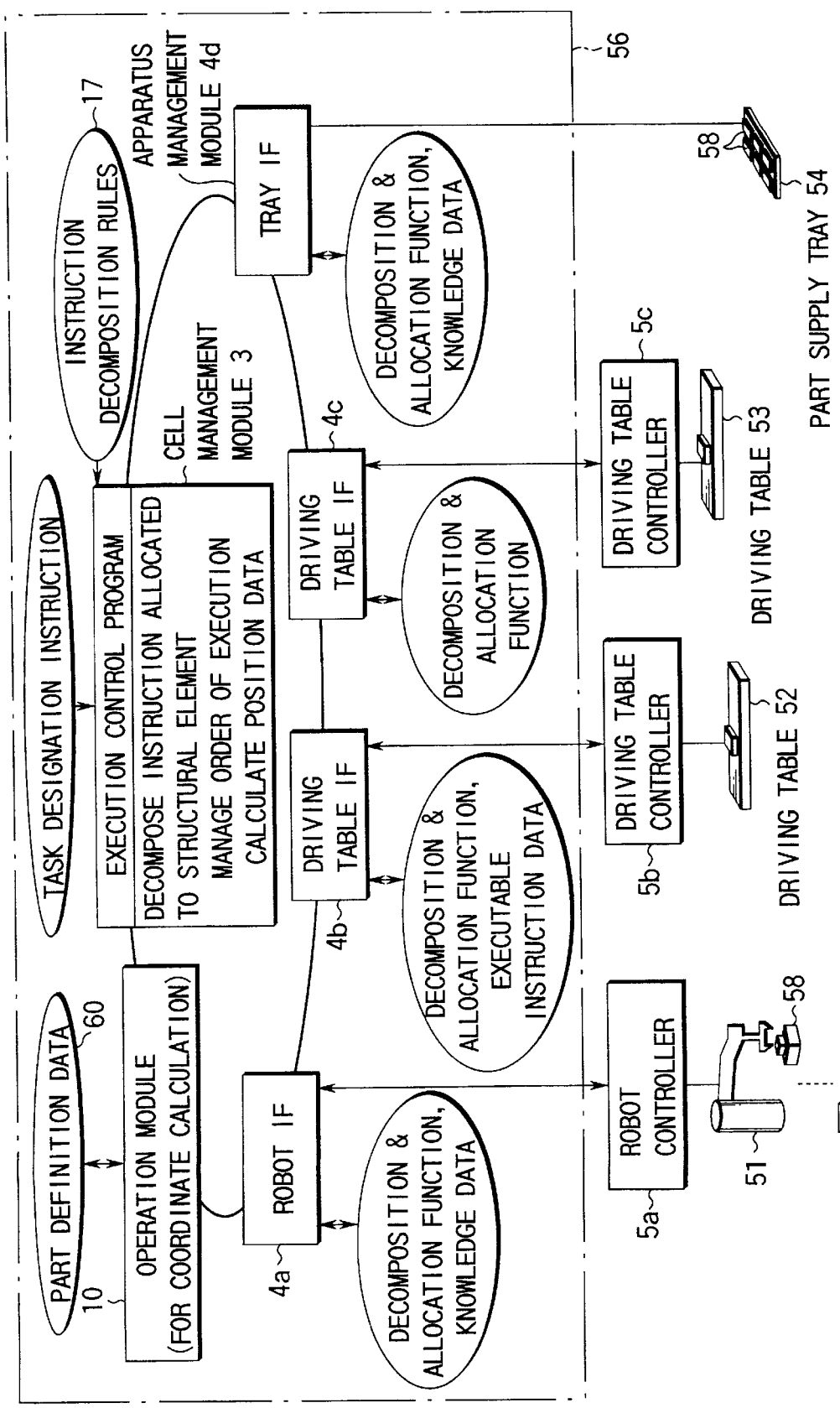
FIG. 5 is a schematic diagram showing one embodiment of the present invention, which is an example of a case wherein the system of the present invention is applied to a part assembling apparatus.

FIG. 5 shows an assembling apparatus to which the control system of the present invention is applied. In FIG. 5, the structural elements similar to those shown in FIG. 1 (such as structural elements 2, 3, 4 and 5 of FIG. 1) are expressed by attaching subscripts to the reference numbers used in FIG. 1.

Figure 6:
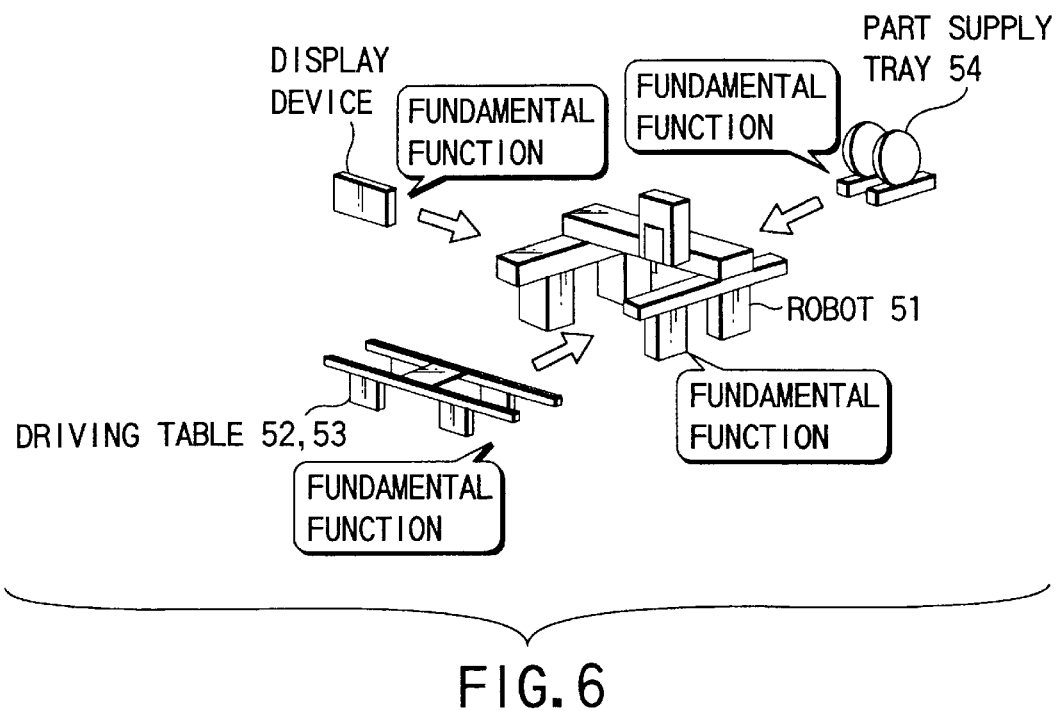
FIG. 6 is a perspective view of another part assembling apparatus.

Referring to FIG. 5, a cell management module 3 (a task decomposing/allocating holon module) used for managing the part assembling apparatus is provided under a production shop management module (not shown). The cell management module 3 comprises apparatus management modules (task executing holon modules) 4a to 4d for managing and controlling the structural elements (FIG. 6) of the part assembling apparatus, such as a robot 51, driving tables 52 and 53, and a part supply tray 54. The apparatus management modules 4a to 4d are designed to function as a robot interface (IF) 4a, driving table interfaces 4b and 4c, and a part tray interface 4d, respectively. Interfaces 4a to 4d are connected to a robot controller 5a, a driving table controller 5b, another driving table controller 5c, and the part supply tray 54, respectively.

Each of the holon modules 3 and 4a–4d are installed inside an engineering work station (hereinafter referred to as "EWS") 56 in the form of a software module.

Figure 7:
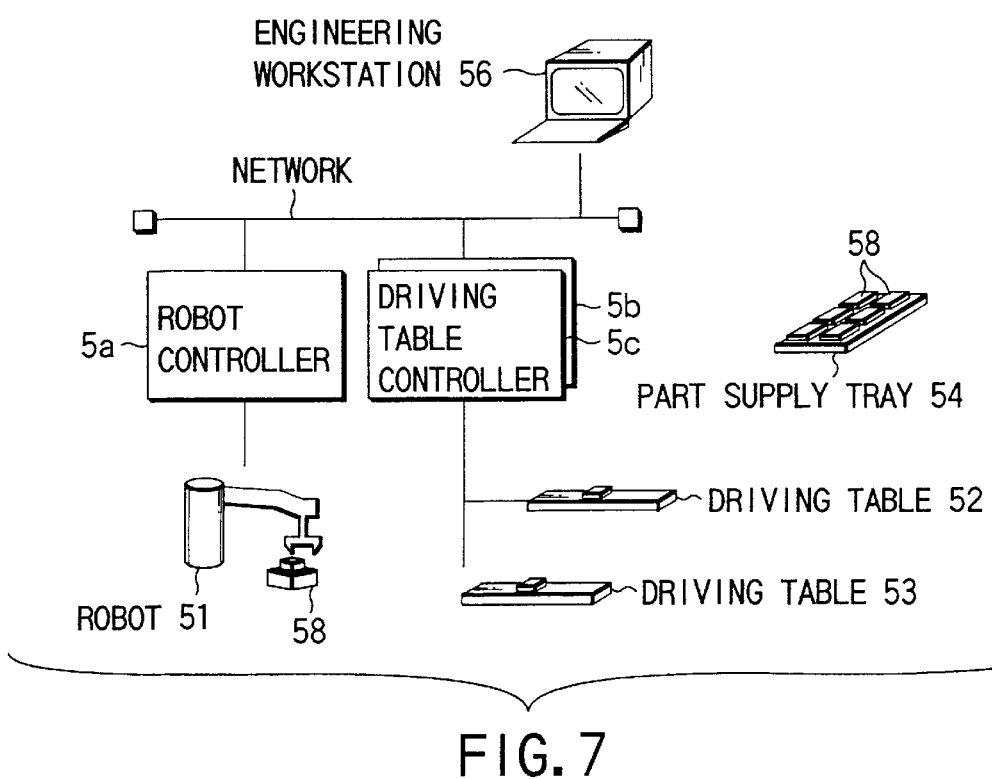
FIG. 7 is a schematic diagram showing the part assembling apparatus of FIG. 5.

As shown in FIG. 7, the robot controller 5a and the driving table controllers 5b and 5c are connected through a network to the EWS 56.

The robot controller 5a controls the robot 51 and causes the robot 51 to perform various operations with its hand, such as the clamping, lifting, moving and placing of part 58. The robot controller 5a has an online control function. Specifically, it executes instructions of an ordinary task level one by one, and sends the results of each instruction to the EWS 56.

Each of the driving table controllers 5b and 5c controls two driving tables 52 and 53 by executing instructions of an ordinary task level. To be more specific, each of the driving tables 52 and 53 is an XY table apparatus which is driven in the X-Y directions by means of one stepping motor for each direction. Viewed from the hardware aspect, the X-Y table apparatus is controlled by a single controller. Viewed from the software aspect, it is controlled by two independent software programs.

The robot 51, the driving tables 52 and 53, the robot controller 5a, and the driving table controllers 5b and 5c may be of a known structure.

The part supply tray 54, with which to supply parts 57, does not include a controller since it does not operate by itself. Thus, the part tray IF 5d (apparatus management holon module) allocates a task (e.g., a preparatory task) to another apparatus or the operator.

As shown in FIG. 5, the operation module 10 (which performs coordinate conversion) is inserted in the line that connects the cell management holon module 3 and the apparatus management holon modules 4a–4d. The operation module 10 performs calculation required for polar coordinate conversion. In addition to this function, the operation module 10 can calculate the positions to which the robot 51 and the driving tables 52 and 53 must be moved, on the basis of the shape, size and attributes of each part stored in a part definition data file 60 (examples of the attributes are an access position of the robot's hand, the clamping position thereof, and data on the position of each part).

(Operation of the Apparatus)

Figure 8:
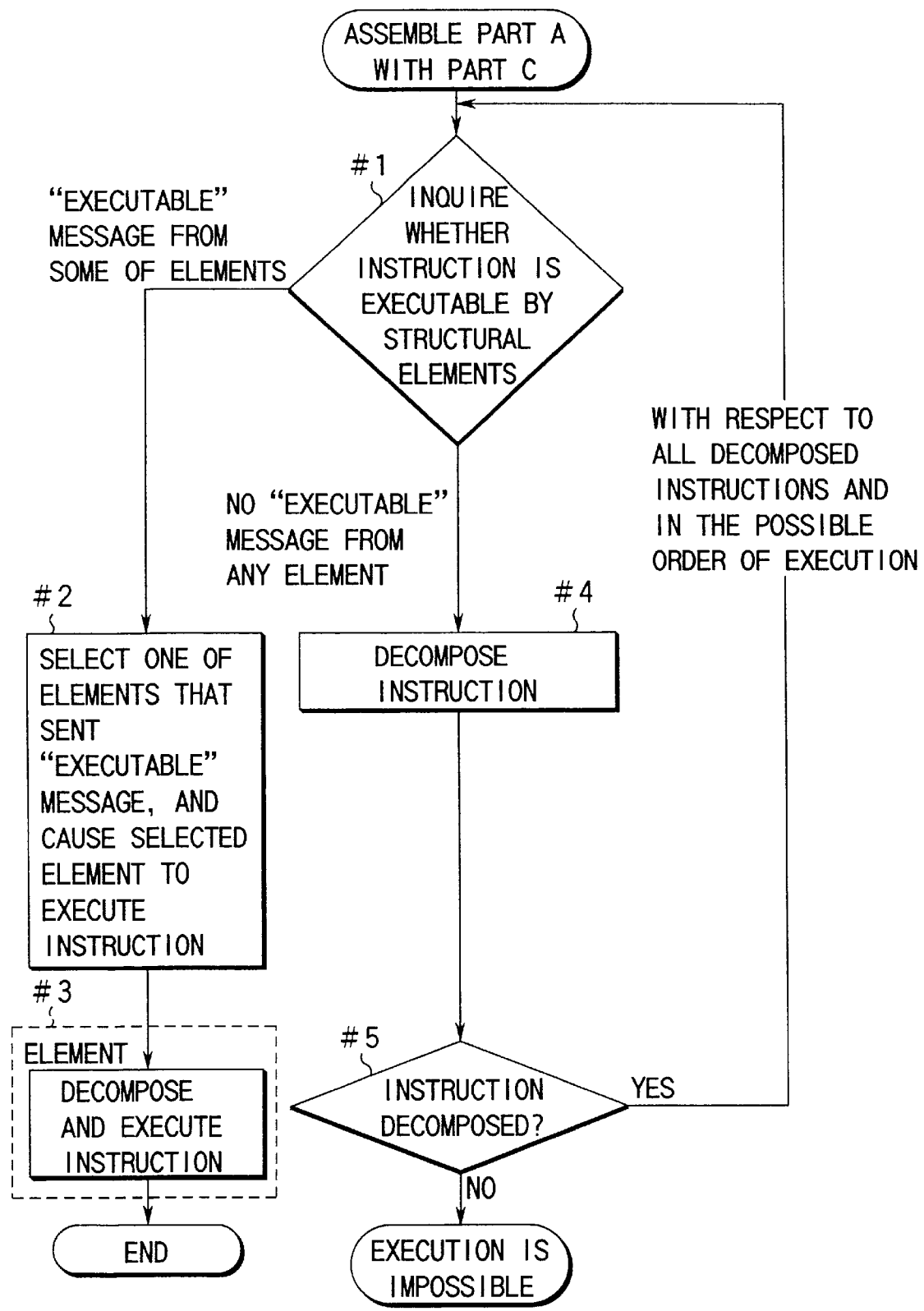
FIG. 8 is a control flowchart used by the system.

The operation of the apparatus of the above structure will be described, referring to the control flowchart shown in FIG. 8. The control flowchart corresponds to part of the flowchart shown in FIG. 4.

(Inquiry Made to See Whether Task is Executable)

When the cell management holon module 3 (FIG. 5) described above receives a task instruction, such as "Assemble (Part A, Part B)", it first makes an inquiry to the lower-order apparatus management holon modules (i.e., robot IF 4a, driving table IFs 4b and 4c, tray IF 4d, and the operation module 10) so as to check whether the lower-order apparatus management holon modules can execute the task instruction.

(Case Where Task is Inexecutable)

If the task instruction "Assemble (Part A, Part B)" cannot be executed by the robot IF 4a, the driving table IFs 4b and 4c and the tray IF 4d without decomposition, the cell management holon module 3 does not receive any reply to its inquiry from the IFs 4a–4d.

(Decomposition of Task Instruction)

If the task instruction cannot be executed by any of the IFs 4a–4d, the cell management module 3 advances to steps #4 and #5. In accordance with the decomposition rules described in an instruction decomposition rule file, the task instruction is decomposed into a sequence of operation instructions that can be executed by each IF.

Figure 9:
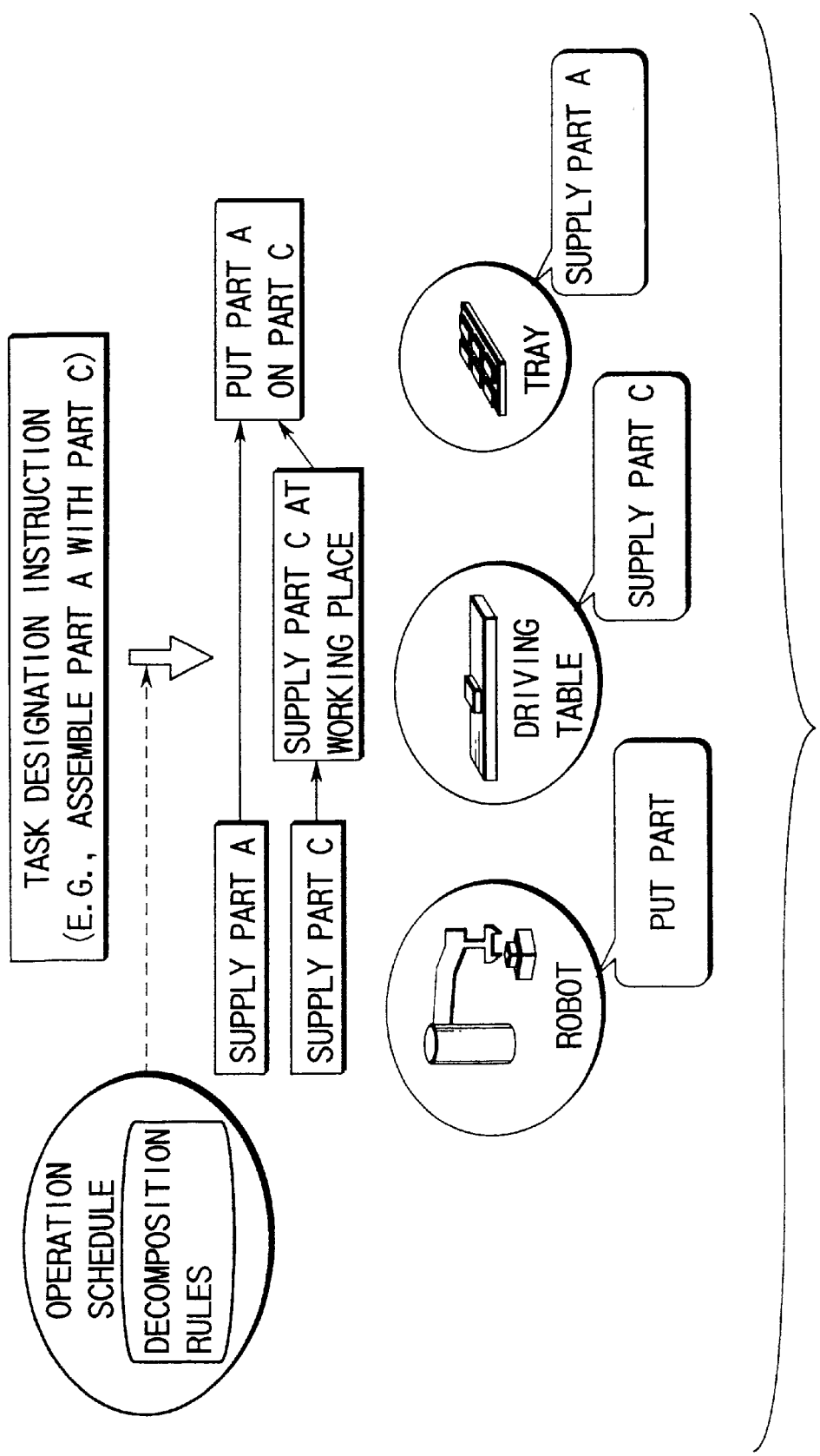
FIG. 9 is a schematic view showing how a task instruction is decomposed and allocated in the system.

The cell management module 3 decomposes the task instruction "Assemble (Part A, Part C)" such that it is divided into a sequence of operation instructions, such as those shown in FIG. 9. To be more specific, the task instruction is decomposed based on the function of managing the order of execution such that "Supply Part A" and "Supply Part C" are executed first, and then "Supply Part C at working place" and "Put Part A on Part C" are executed.

The cell management module 3 asks the operation module 10 for information indicating where parts A and C should be located in each of the operation instructions "Supply Part A", "Supply Part C", "Supply Part C at working place" and "Put Part A on Part C." For example, the information asked for are the positions of parts A and C, the position at which the Part C is placed in the working place, the position at which Part A is placed on Part C, etc.

The operation module 10 calculates the positions to which the robot 51 and the driving tables 52 and 53 should be moved, on the basis of the data stored in the part definition data file 60, such as the data on the shape, size and attributes of each part (examples of the attributes are an access position of the robot's hand, the clamping position thereof, and data on the position of each part).

The information request to the operation module 10 may be made by each of the IFs 4a to 4d. That is, the IFs 4a to 4d may access the operation module 10 to obtain the information on the positions of parts A and C, the position at which Part C is placed in the working place, the position at which Part A is placed on Part C, etc.

(Second Inquiry)

Then, the cell management module 3 returns to step #1 and makes an second-time inquiry to IFs 4a–4d so as to check whether the decomposed operation instructions "Supply Part A", "Supply Part C", "Place Part C at working place" and "Put Part A on Part C" are executable. The inquiry is made based on the order of execution.

First of all, the tray IF 4d receives the instruction "Supply Part A" from the cell management module 3, along with data regarding the position at which the hand of the robot 51 should clamp Part A (the clamp position is obtained by the operation module 10). Upon receipt of these, the tray IF 4d informs the cell management module 3 that the instruction is executable and also of the position at which the robot 51 should clamp Part A.

Then, the tray IF 4d receives the instruction "Supply Part C" from the cell management module 3, along with data regarding the position at which the hand of the robot 51 should clamp Part C (the clamp position is obtained by the operation module 10). Upon receipt of these, the tray IF 4d informs the cell management module 3 that the instruction is executable and also of the position at which the robot 51 should clamp Part C.

Then, the driving table IFs 4b and 4c receives the instruction "Supply Part C" from the cell management module 3, along with data regarding the position at which the hand of the robot 51 should clamp Part C. Upon receipt of these, the driving table IF 4b informs the cell management module 3 that the instruction is executable, and requests that the operator put Part C on the working place. After this, the task instruction is decomposed to produce the instruction that the hand of the robot 51 should move Part C to the clamping position. To be more specific, the driving table IFs 4b and 4c check the specifications of the controllers 5b and 5c of the driving tables 52 and 53 and decompose the task instruction to obtain a instruction that should be sent to the high-speed pulse generators of the driving tables 52 and 53.

Accordingly, the driving tables 52 and 53 are driven and convey Part C to the position at which it is clamped by the hand of the robot 51.

(Task Allocation to Robot Controllers)

Thereafter, the robot IF 4a receives an instruction of a task level similar to that of "Supply Part C at working place", along with the position of Part C obtained by the operation module 10. Upon receipt of these, the robot IF 4a informs the cell management module 3 that the instruction is executable and decomposes the instruction in such a manner as to obtain an instruction that can be executed by the robot 51 and its hand. For example, the instruction obtained is "Move the hand to the position of Part A, and open the hand". After allocating such a decomposed instruction to the robot controller 5a, the operation is brought to an end.

Accordingly, the robot 51 takes hold of Part A, lifts it, and positions it above Part C. Subsequently, the robot 51 lowers Part A in such a manner that it is placed on Part C.

When the cell management module 3 makes an inquiry to the IFs 4a–4d whether the instructions "Supply Part A", "Supply Part C", "Supply Part C at working place" and "Put Part A on Part C" are executable, it may happen that the cell management module 3 will receive a response to the effect that the instruction cannot be executed. If the cell management module 3 receives such a response from an IF, the decomposition of the instruction and the allocation thereof to that IF are repeated until a response to the effect that the instruction is executable is sent back from the IF.

In the manner described above, the operations corresponding to the instructions of the task instruction "Assemble Part A and Part C" are performed by the robot 51, the driving tables 52 and 53 and the part supply tray 54.

When the robot 51 is replaced with a new robot 62, the robot IF 4a is also replaced with a new robot IF corresponding to the new robot 62.

Like the robot IF 4a, the new robot IF has a function of decomposing an instruction from the cell management module 3 into instructions that can be executed by the robot 62 and its hand, a function of converting the decomposed instructions into data of an appropriate coordinate system, and a function of allocating the data. The new robot IF, however, differs from the robot IF 4a in view of the use of a function model (element 9 in FIG. 3) in which executable task instructions are stored.

An instruction allocated to the robot IF has a task level similar to that of the instruction "Supply Part C at the working place" sent from the cell management module 3. Upon receipt of an instruction of such a task level, the robot IF decomposes the instruction into executable instructions, for example, into "Move the hand to the position of Part A, and open the hand". The decomposed instructions are allocated to the robot controller one by one, and the operation is brought to an end.

As can be seen from the above, when the robot 51 is replaced with the new one 62, it is possible to flexibly cope with this replacement.

In the case where structural elements are connected as lower-order elements of the robot IF 4a or driving table IFs 4b and 4c, for example a case where apparatus modules for auxiliary robots (the operation executing holon modules shown in FIG. 3) are connected as lower-order modules of the robot IF 4a, the robot IF 4a further decomposes the instruction allocated by the cell management module 3, and sequentially allocates the resultant instructions to the lower-order apparatus modules.

In this manner, robot IFs (apparatus management holon modules) or similar interfaces may be connected as lower-order elements of the cell management module 3, and auxiliary robot IFs (apparatus management holon modules) may be connected as still lower-order elements. Even when a hierarchical structure is formed in this manner, the apparatus structure required for task processing can be selected, and tasks can be allocated to the selected apparatus structure. Accordingly, it is possible to flexibly cope with a change in the structure of the apparatus.

According to the first embodiment of the present invention, the cell management module 3, which serves as a task decomposing/allocating holon module, makes an inquiry to the task-executing holon modules (e.g., robot IF 4a) to check whether a task instruction is executable, and receives responses to the inquiry from the task-executing holon modules. Then, the cell management module 3 allocates the instruction to the task executing holon modules that send an "executable" response to the cell management module 3. If the cell management module 3 receives an "inexecutable" response, it decomposes the corresponding task instruction into a sequence of operation instructions and makes an inquiry to the task executing holon module that sent the response to check whether the operation instructions are executable. The decomposition of the instructions and the allocation thereof to the holon module are repeated until an "executable" response is sent back from the holon module. Accordingly, even if an existing apparatus, such as the robot 51, is replaced, or the apparatus or a group of apparatuses are modified in structure, the modification can be easily coped with.

Owing to this feature, it is possible to satisfy what is required of the production system of the next generation, such as prompt start of production, prompt and flexible response to a change in the amount of production or a change in the kind of items to be produced, and reuse of production facility or systems.

The allocated instruction can be decomposed, and operations obtained thereby can be sequentially allocated to the lower-order holon modules. Even when a group of apparatuses are restructured to constitute a hierarchical structure, the restructure can be easily coped with.

In addition, a task can be designated by a general task designation instruction. Hence, it is not necessary to prepare an instruction or program in accordance with the structural elements, and the operation for allocation can be performed with a high degree of flexibility.

The present invention is not limited to the embodiment described above, and may be modified in accordance with the need.

The above embodiment was described, referring to the case where the present invention is embodied as an assembling system that supplies parts and places them on something. Needless to say, the present invention is not limited to this, and is applicable to control of a variety of devices.

In the embodiment described above, an inquiry to structural elements may be made when the power supply is turned on, and a list of the structural elements and a list of instructions executable by them can be prepared by the inquiry. If this is done, it is not necessary to make an inquiry each time an instruction is issued.

As detailed above, the present invention can provide a control system capable of flexibly coping with a change in the structure of the apparatus or apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control system for executing task instructions, comprising:

a higher-order module configured to make an inquiry as to whether or not a task instruction can be executed; and a lower-order module configured to determine whether or not the task instruction can be executed, in response to the inquiry made by the higher-order module, said higher-order module including a task instruction decomposition section configured to decompose the task instruction into a sequence of task instructions executable by the lower-order module, when the task instruction is inexecutable by the lower-order module, and further including a task instruction allocation section configured to allocate an executable task instruction to the lower-order module.

2. A control system according to claim 1, wherein said higher-order module includes an allocation optimization section which is used when a plurality of lower-order modules that can execute a task instruction are available and which allocates the task instruction to the lower-order modules according to optimization rules.

3. A control system according to claim 1, wherein said higher-order module includes:

a function model configured to store a sequence of task instructions that can be executed by combining a plurality of lower-order modules, and further to store attributes of the task instructions; and a negotiation section configured to determine whether a task instruction can be allocated to the lower-order modules by referring to the function model.

4. A control system according to claim 1, wherein:

said lower-order module includes a negotiation section configured to send a schedule to the higher-order module in response to the inquiry made by the higher-order module when the lower-order module can execute the task instruction; and said higher-order module includes an allocation optimization section configured to allocate the task instruction based on said schedule.

5. A control system according to claim 1, wherein said higher-order module includes:

a load model configured to store a schedule of the higher-order module and schedules of a plurality lower-order modules; and an allocation optimization section configured to determine schedules used when the task instruction is allocated to the lower-order modules, by referring to the load model.

6. A control method for controlling a system that is made up of a plurality of modules being arranged to constitute a hierarchical configuration, wherein higher-order module which is arranged against one or more lower-order modules executes steps of:

making an inquiry to at least one lower-order module to check whether or not a task instruction can be executed, and for receiving a response from said lower-order module;

allocating the instruction to a lower-order module which responds to the inquiry that the instruction is executable, and decomposing the instruction if there is no lower-order module makes a response that the task instruction is executable, and making an inquiry to at least one lower-order module once again to check whether or not decomposed instructions are executable; and repeatedly executing decomposition of instructions and allocation thereof until the decomposed instructions become executable by the lower-order module and are allocated thereto.

7. A control method according to claim 6, further including a step of, when a plurality of lower-order modules that can execute a task instruction are available, allocating the task instruction to the lower-order modules according to optimization rules.

8. A control method according to claim 6, wherein said higher-order module includes a load model for storing a schedule of the higher-order module and schedules of a plurality lower-order modules, and said method includes a step of determining schedules used when the task instruction is allocated to the lower-order modules, by referring to the load model.

* * * * *